United States Patent [19]
Kulkarni et al.

[11] Patent Number: 6,138,016
[45] Date of Patent: Oct. 24, 2000

[54] DISTRIBUTING LOCATION TRACKING FUNCTIONALITY IN WIRELESS TELEPHONE SYSTEMS

[75] Inventors: Jayant A. Kulkarni, Plano; Spencer Dawkins, Allen; Michael Hall, Carrollton, all of Tex.

[73] Assignee: Nortel Networks Corporation, Canada

[21] Appl. No.: 08/760,276

[22] Filed: Dec. 4, 1996

[51] Int. Cl.[7] .................................................. H04Q 7/20
[52] U.S. Cl. ......................... 455/433; 455/33.1; 455/33.2
[58] Field of Search ................... 455/433, 8, 432, 455/423, 453, 435, 422, 524, 509, 426, 456

[56] References Cited

U.S. PATENT DOCUMENTS

| | | | |
|---|---|---|---|
| 4,670,899 | 6/1987 | Brody et al. | 455/453 |
| 4,876,738 | 10/1989 | Selby | 455/435 |
| 5,241,685 | 8/1993 | Bodin et al. | 455/453 |
| 5,307,400 | 4/1994 | Sawyer et al. | 455/456 |
| 5,361,396 | 11/1994 | Onoe et al. | 455/435 |
| 5,369,684 | 11/1994 | Buhl et al. | |
| 5,396,543 | 3/1995 | Beeson, Jr. et al. | |
| 5,408,683 | 4/1995 | Ablay et al. | 455/433 |
| 5,479,481 | 12/1995 | Koivunen | 455/422 |
| 5,490,201 | 2/1996 | Moberg et al. | 455/433 |
| 5,497,412 | 3/1996 | Lannen et al. | |
| 5,544,223 | 8/1996 | Robbins et al. | 455/426 |
| 5,561,840 | 10/1996 | Alvesalo et al. | 455/433 |
| 5,561,854 | 10/1996 | Antic et al. | 455/433 |
| 5,594,942 | 1/1997 | Antic et al. | 455/423 |
| 5,600,705 | 2/1997 | Maenpaa | 455/433 |
| 5,628,051 | 5/1997 | Salin | 455/433 |
| 5,697,054 | 12/1997 | Anderson | 455/524 |
| 5,697,059 | 12/1997 | Carney | 455/509 |
| 5,713,073 | 1/1998 | Warsta | 455/524 |

FOREIGN PATENT DOCUMENTS 0 295 022  6/1988  European Pat. Off. .

OTHER PUBLICATIONS

Carney, D.L, Cochrane, Gitten L.J., Prell, E.M. Staehler R., AT&T Technical Journal, vol. 64, No. 6, Jul.–Aug. 1985, Architectural Overview.

Goodman, David, Trends in Cellular and Cordless Communications, IEEE Communications Magazine, Jun. 1991.

Primary Examiner—Daniel S. Hunter
Assistant Examiner—Pablo Tran
Attorney, Agent, or Firm—Finnegan, Henderson, Farabow, Garrett & Dunner, L.L.P.

[57] ABSTRACT

There is disclosed a wireless communication system, including a distributed HLR, for tracking the location of mobile terminals moving between zones. There is also disclosed a method for distributing and managing the load created by the HLR functionality among a number of separate processing machines. The method permits dynamic load balancing among the HLRs to more evenly distribute the load.

9 Claims, 4 Drawing Sheets

DISTRIBUTING LOCATION TRACKING FUNCTIONALITY IN WIRELESS TELEPHONE SYSTEMS

BACKGROUND OF THE INVENTION

The present invention relates to wireless telephone communication, and more particularly to a wireless communication system with a distributed home location register for tracking mobile units as they move between service areas.

Conventional wireless telephone systems contain several service areas, "zones," interconnected by data and voice networks. A zone may contain several base station transceivers and base station controllers, switching equipment, and a Visitor Location Register (VLR). Each base station provides radio links to mobile terminals serviced by a respective zone.

A switch, attempting to deliver calls to a Mobile Terminal, accesses a Home Location Register (HLR) which identifies the VLR, and hence the zone, where each mobile terminal is currently located. This enables the switch to route calls to the base station currently serving the mobile terminals. The HLR also stores information concerning the services enabled for each mobile terminal and information used to control access by the mobile terminals to the wireless communication system. Thus, the HLR must process updates to mobile terminal location information, updates to subscriber service information, and queries for location of mobile terminals.

The VLR temporarily stores the subscriber data for each mobile terminal currently located in the serving zone. The HLR downloads the subscriber's data to the VLR when prompted by the VLR. Thus, the HLR must respond to these data requests and transmit the information to the VLR. The process of receiving and responding to a request for subscriber's data and downloading the data to the VLR is known as location tracking because the process monitors a mobile terminal's location as it moves between zones.

In conventional wireless telephone systems, a single server, common to all of the zones, has provided the HLR function for the multitude of mobile terminals serviced by the system. The single server architecture is problematic because the HLR must be accessed to register with the system and to terminate the mobile terminal's connection to other callers, and therefore, failure of the HLR results in immediate loss of service to the entire system. Consequently, the HLR has often been a fault-tolerant and expensive machine.

Considering the foregoing, a need exists for a wireless communication system that ensures that the failure of a single node, associated with the HLR, does not cause a loss of service to the entire set of mobile terminals serviced by that HLR.

SUMMARY OF THE INVENTION

To overcome the requirement of localizing the HLR in a single expensive machine, with a very high rate of messages per second and data base transactions per second, and according to this invention, the HLR function is distributed across multiple processors. The impact on service of a single HLR processor failure is less severe in such a distributed architecture. Consequently, the processors need not be as reliable, expensive, or have as high a throughput as those used in the current architecture. Moreover, having mobile terminal data accessible on more than one server substantially reduces the impact of individual server failures. In addition, maintaining mobile terminal data on several servers allows an allocation of the processing load among the servers according to current traffic conditions therefore, reducing processing delays.

Further, maintaining subscriber data on several servers, allows individual servers to be taken out of service for maintenance and upgrades without disabling the entire system. In addition, increasing the number of servers expands the server processing power without increasing the size of a single server. Moreover, server costs are more accurately scaled in accordance with system demands, thereby, providing better overall cost performance.

To achieve these and other advantages and in accordance with the purpose of the invention, as embodied and broadly described herein, the present invention, a wireless communication system, including a distributed HLR functionality, for tracking the location of mobile terminals, includes: a mobility control point (MCP) mechanism, for controlling communications in several of geographically spaced zones and providing storage capabilities for service information relating to mobile terminals; a number of central processing units (CPUs) associated with each MCP, each CPU including a HLR, for storing the enabled service information of a subset of mobile terminals serviced by the zones; a number of VLRs associated with each CPU, for temporarily storing mobile terminal data and connected to the CPUs for communicating with the CPUs and corresponding HLRs; and means, including the VLR and HLR, for tracking the location of the mobile terminals from one zone to another.

In another aspect, the invention is a method for distributing the HLR functionality and managing the HLR load distribution in a wireless communication system, the method includes the steps of: storing a number of mobile terminal identifiers, for identifying a mobile terminal and service data associated with the mobile terminal, in the memory of a MCP; partitioning the mobile terminal identifiers among a number of means for tracking the location of mobile terminals moving among a number of zones; transmitting the partitioning of mobile terminal identifiers to the memory of each means for tracking, for access by the zones associated with each means for tracking; computing current and optimal load distribution among the means for tracking; periodically transmitting load information to a LTSM; re-distributing the mobile terminal identifier partitioning among the plurality of means for tracking; and transmitting the partitioning to an HLR, associated with each means for tracking, upon receipt of an overload message from one of the means for location tracking.

It should be understood that both the foregoing general description and the following detailed description are exemplary and explanatory and are intended to provide a further explanation of the invention as claimed.

The accompanying drawings are included to provide a further understanding of the invention and are incorporated in and constitute a part of this specification, illustrate embodiments of the invention, and together with the description serve to explain the principles of the invention.

DESCRIPTION OF PREFERRED EMBODIMENT

Reference will now be made in detail to the present preferred embodiment of the invention, examples of which are illustrated in the accompanying drawings. Wherever possible the same reference numbers will be used throughout the drawings to refer to the same or like parts.

Figure 1:
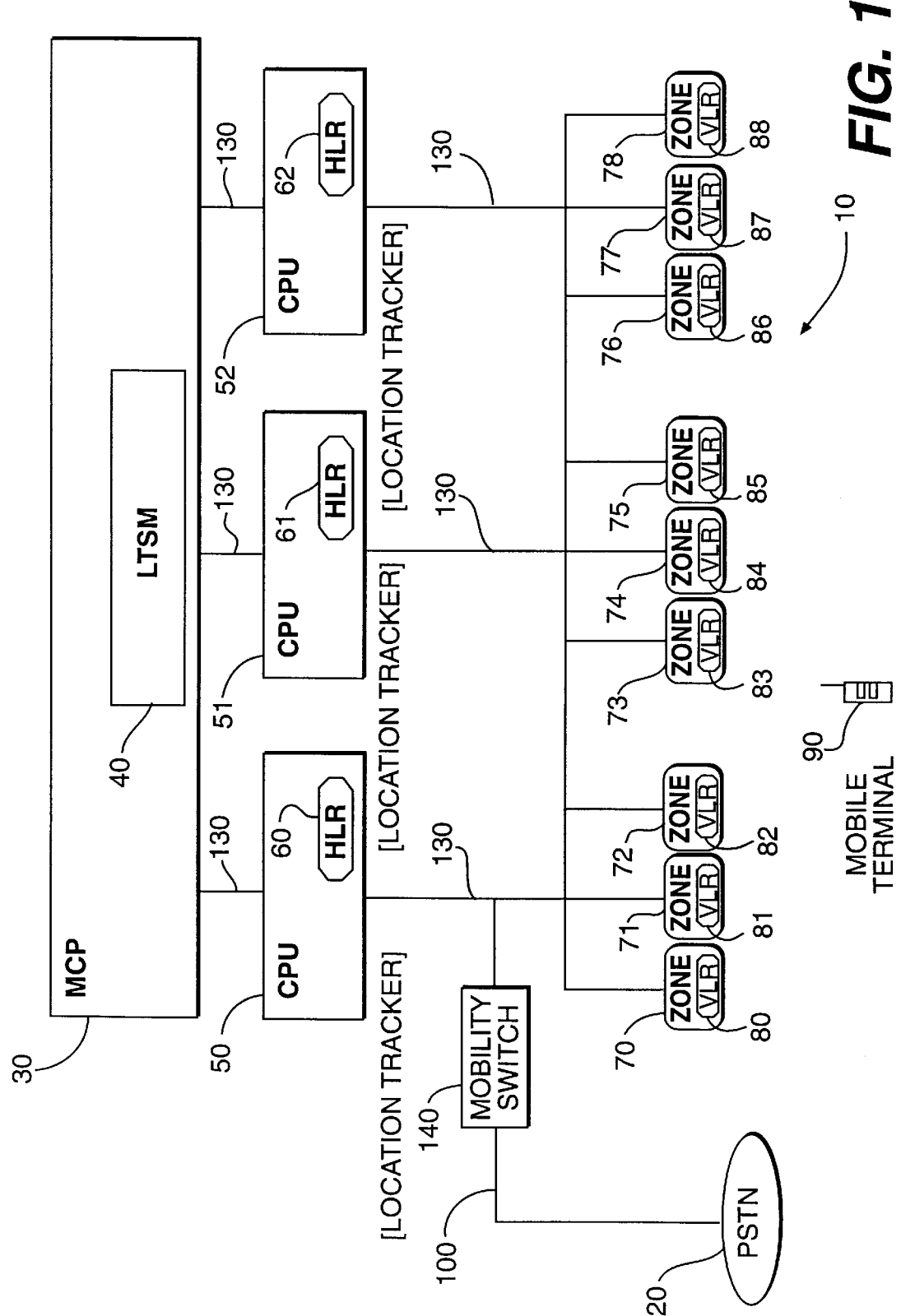
FIG. 1 is a block diagram of a wireless telecommunication system incorporating the present invention.

FIG. 1 shows a wireless communication system 10, including a distributed HLR and a number of zones, for tracking mobile terminal location, in accordance with the present invention. In a preferable embodiment, the term wireless communication system includes, but is not limited to, cellular systems and low powered personal telephone communication systems. Each zone includes a VLR 80–88 for temporarily storing mobile terminal data and information, plus the functionality necessary to implement localized data storage and call management operations. The elements necessary to perform this functionality includes several base station transceivers, a number of base station controllers, and various switching equipment. Zones 70–78 and corresponding VLR 80–88 are connected to CPUs 50–52 via a data network or a data over voice network (data/voice) 130 for communicating with the plurality of CPUs 50–52 and their corresponding HLR 60–62. Data/voice network 130 permits each zone 70–78 to communicate with each CPU 50–52. Each zone 70–78 is also connected by communication line 100 to a public service telephone network (PSTN) 20 (only one connection shown) for sending and receiving voice calls. The mobility switches 140 (only one shown in the figure) are connected to data/voice network 130 and to the PSTN 20. Mobility switch 140 may receive incoming calls for mobile subscribers, query the distributed HLR, and route the calls to the appropriate zone for delivery to the appropriate mobile terminal 90.

HLRs 60–62 are each associated with one CPU 50–52, and each CPU 50–52 and associated HLRs 60–62 are collectively referred to as a location tracker. HLRs 60–62 employ processors and memory registers along with software instructions to store the enabled service information of each mobile terminal 90. The plurality of CPUs 50–52 are connected over the data/voice network 130 to a mobility control point mechanism (MCP) 30.

MCP 30 contains a location tracking service manager (LTSM) 40 for maintaining proper load distribution throughout system 10, and a central database accessible by HLRs 60–62 for retrieving mobile terminal configuration information and service data. MCP 30 is connected to the plurality of CPUs 50–52 over the data/voice network 130.

The platform or hardware architecture of MCP 30 may be any general purpose computing platform, such as a Hewlett Packard 9000 series machine running HPUX. In a preferable embodiment, MCP 30 also contains a database from which the HLRs get their service information. The HLR stores terminal location information into this database during a service switch over and the new information is read by the new HLR servicing the mobile terminal. In a preferable embodiment, the database is implemented with an Informix Database.

MCP 30 contains a LTSM 40 for managing location tracking load balancing. The location tracking function, namely, determining the location of a mobile unit 90, is performed by a VLR 80–88, and CPU 50–52 and its corresponding HLR 60–62. LTSM 40 is implemented by circuitry or software and is functionally accessible at a well known network address. MCP 30 has software and circuitry to create the addressing information or port number information for LTSM 40. The address information will depend on the transport mechanism selected. In a preferable embodiment, the use of a TCP/IP protocol makes LTSM 40 location an IP address and port number, while using SS7 would make it a Point Code and a Subsystem Number.

To perform its load management functions, LTSM 40 maintains a list of mobile terminals by cataloging the mobile identifier (MI) associated with mobile terminal 90. The MI, also known as the mobile identifier number (MIN) or Portable Identifier (PID), follows the known standards set by the utilized protocol, such as IS54 or CT2. The present invention is not limited by this protocol and may be employed on other systems such as those utilizing the Global Systems for Mobile Communications (GSM) standards (utilized in most European and Asian personal communication systems).

The list of MIs is partitioned by LTSM 40 into blocks. The functional representation of the partitioning activity is illustrated by the following example. With N being the number of CPUs and corresponding HLRs, LTSM 40 picks a number M, where M is much greater than N. LTSM's 40 performs a function (f) such that f(MI)=m, $0 \leq m < M$, where M is the number of partitions. The function f maps an MI to a unique partition number, m. In this manner, LTSM 40 divides the number of mobile identifiers into multiple partitions, and it then assigns one or more partitions to each HLR 60–62. LTSM 40 also provides this association of partitions with HLRs 60–62 to all VLRs 80–88 and mobility switch 140. This mapping of partitions to the HLR 60–62 is then stored in memory and is referred to as a Z-Table. The Z-table thus is a memory map of partitions to location trackers stored in local memory and transmitted to the zones and mobility switches. In a preferred embodiment, the zones and the mobility switches all have the logic to perform the function f which maps a MI to a partition number.

To manage the location tracking load distribution, the LTSM 40 does not force load balancing, it informs CPU 50–52 to reassign the loads. For example, if CPU 50–52 reports an overload condition to LTSM 40, LTSM 40 directs CPU 50–52 to reject requests for mobile terminals assigned to a certain number of partitions. This forces the VLR 80–88 to seek a different HLR 60–62 with which to register. In another example, if an HLR 60–62 is removed from the system for service or due to a system node failure, LTSM 40 sets the load on the CPU to 0 and re-distributes the partitions assigned to that HLR among the remaining HLRs.

CPU 50–52 and corresponding HLR 60–62 work together to track the location of mobile terminal 90 as it moves between zone 70–77 coverage areas. In a preferable embodiment, CPUs 50–52 are computing machines with the capability of performing instruction sets received by an external entity or stored within its localized memory. CPUs 50–52 also have sufficient memory to maintain a listing of their assigned mobile identifiers along with other subscriber data profiles and information.

HLRs 60–62 are memory registers implemented through circuitry or software. In a preferable embodiment, data stored in the HLRs 60–62 are readable over data/voice network 120 and 130, and sufficiently stable to maintain the data for a indefinite period. The data related to subscribers is stored in memory and is capable of being transmitted to the memory of a requesting VLR 80–88.

VLR 80–88 is a register or memory processor implemented by software and circuitry. VLR 80–88 has the ability to receive mobile subscriber data or terminal profile data from an HLR 60–62 via data/voice network 130. Once received, the data is temporarily stored in an erasable memory.

The following example illustrates the location tracking function performed by system 10. When a mobile terminal 90 enters a zone 70–78, the corresponding VLR 80–88 transmits a registration message to CPU 50–52 and corresponding HLR 60–62 serving that particular MI. For the purposes of further discussion, CPU 50–52 and its corresponding HLR 60–62 are collectively referred to as the Location Tracker or LT. The MI is encoded within the registration message of the mobile terminal seeking registration. In addition, registration messages may belong to any standard protocol, such as IS41 or GSM-MAP, or other standard or proprietary protocols.

Figure 2:
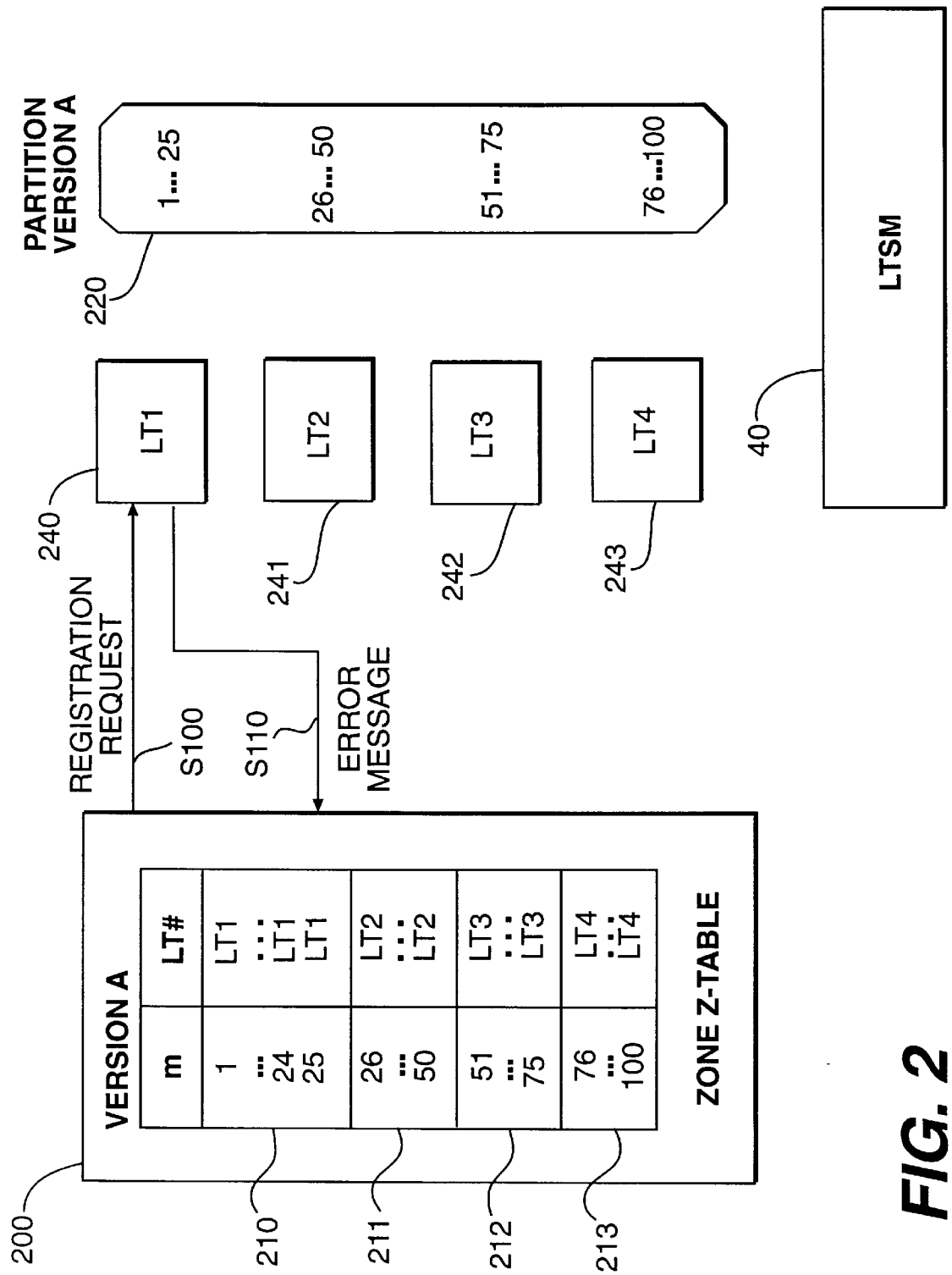
FIG. 2 is graphical representation of the Z-Table memory map for storing mobile identifiers and their serving HLR.
Figure 3:
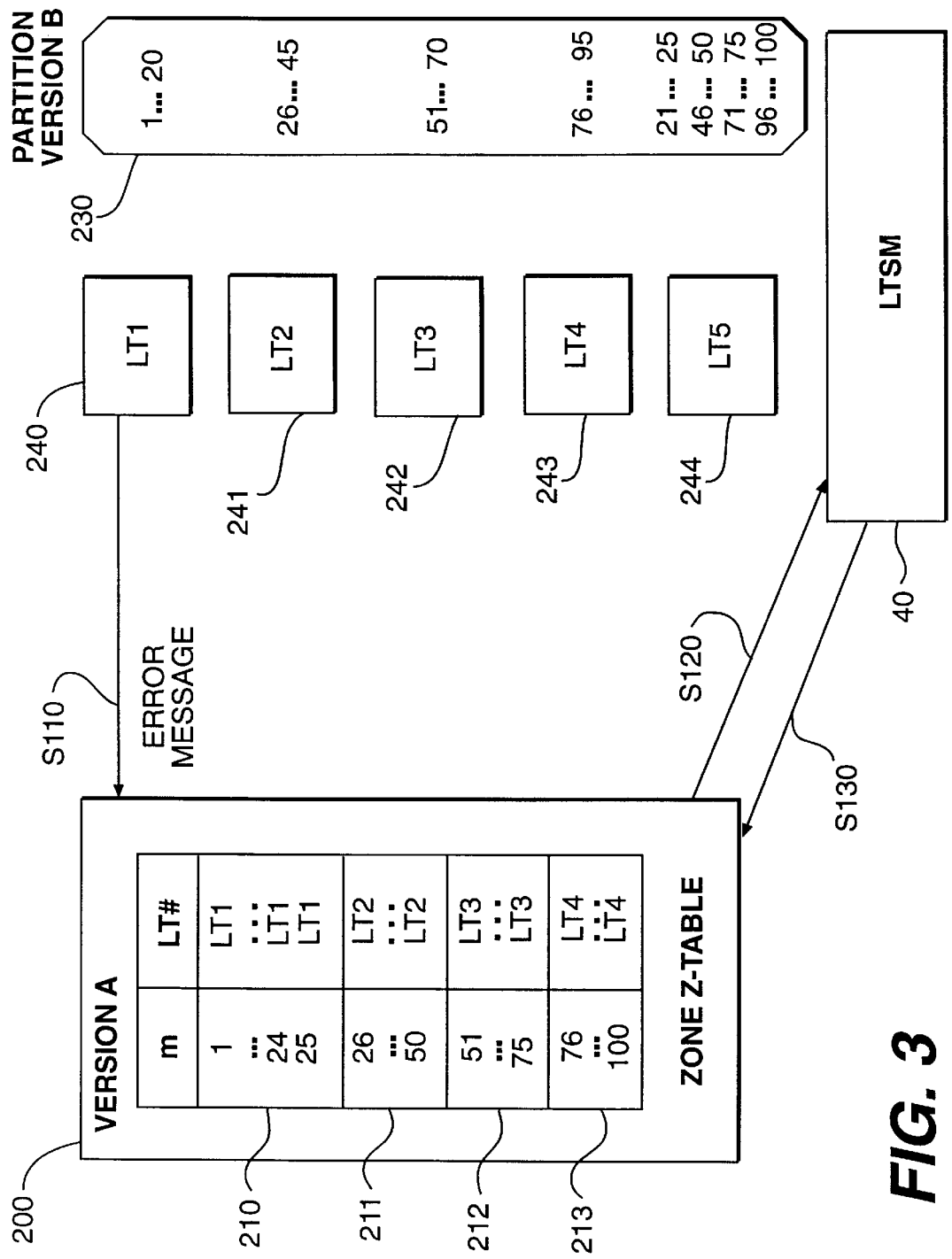
FIG. 3 is graphical representation of a mismatch of the Z-Table memory map stored at a zone with the actual assignment of partitions to HLRs.

Referring to FIGS. 2 and 3, a zone contains, in its localized memory, a Z-table 200 for mapping a partition assigned to a Location Tracker (LT) 240–244. In a preferable embodiment, the Z-table 200 is a memory map that each zone maintains on disk or in local memory, and VLR 80–88 has access to the local memory. VLR 80–88 determines the particular MI's partition assignment by accessing information in the Z-table. For example, during registration the zone equipment only has access to the mobile terminal's MI and if mobile terminal 90 attempts to register with system 10 from its new location, VLR 80–88 will use the MI to target the registration request to the appropriate LT 240–244.

LTSM 40 establishes the partitions by dividing the list of MIs into blocks 210–213. The number partitions per LT is dependent upon the number of LTs 240–244 system 10 is supporting at startup, or during reconfiguration when additional LTs 240–244 are added to or subtracted from system 10.

FIGS. 2 and 3 show a functional representation of the location tracking activity. In a preferable embodiment, the logic for performing function f, as defined above, is available to all VLRs and mobility switches in the system. VLR 80–88 also has access to Z-table 200 with partition version A 220. When a mobile terminal with the MI belonging to partition m=24 enters a zone, the VLR sends a registration message to LT1 240 (S100). LT1 240 then returns an error message to the VLR (S110) because another LT has been added to the system, LT5 244 (see FIG. 3), and LTSM 40 has re-allocated the location tracking responsibility among five LTs instead of the previous four. As a result, LTSM 40 implements new location tracking assignments and creates Z-table version B 230. The VLR then requests an updated version of the Z-table 200 from LTSM 40 (S120). LTSM 40 transmits the new version of the Z-table to the VLR (S130), and the VLR re-registers the mobile terminal with the proper LT, in this case LT5 244 (S100).

Returning to FIG. 1, upon receipt of the registration request, the receiving HLR 60–62 determines if it serves the MI contained within the registration message. If the HLR 60–62 contains the subscriber data and terminal data profile that corresponds with the registration message, it sends the data to the requesting VLR 80–88. Next, HLR 60–62 updates the location of mobile terminal 90 requesting registration and subsequently sends a de-registration message to the previously occupied zone 70–78. This update allows telephone calls to be routed to the appropriate location.

On the other hand, if HLR 60–62 does not service the mobile terminal 90 and the VLR 80–88 sends a registration to the wrong CPU 50–52 and corresponding HLR 60–62 VLR 80–88 gets an error message from CPU 50–52. At this point, VLR 80–88 requests an updated Z-table 200 from LTSM 40.

Preferably, Z-table 200 is dated or time-stamped and periodically updated by LTSM 40. In addition, each LT 240–244 periodically backs up its data on a partition-by-partition basis to LTSM 40, and if a particular LT 240–244 becomes disabled, due to servicing or a system node crash, its partitions 210–213 are distributed among the remaining LTs 240–244. This distribution permits the proper load balancing to be maintained. Moreover, if a particular LT 240–244 becomes overloaded it may off-load a few partitions to another HLR.

In either event, or if another LT 244 is created in system 10, the VLR may request a new version of the Z-table 200 from LTSM 40. LTSM 40 also provides the intelligence to re-distribute the load among LT's 240–244. Each is accomplished by updating Z-table 200 with the latest partition version 230 and propagating the updated Z-table 200 to all LTs 240–244. The new load is distributed such that the least number of mobile terminals are affected. This causes the VLR queries to LTSM 40 to be staggered in time (whenever the zone has to register an affected mobile terminal), thereby avoiding a flood of requests for the newly partitioned information.

As stated above, if an LT, or an entire system node, crashes and its load is taken over by another LT, the functioning LT reads the data partitions from LTSM 40. Time-stamping the data partition versions 220 and 230 further permits all zones associated with the affected MIs to be informed of the data's unreliability during the down time. In a preferable embodiment, the VLR also maintains a time-stamp of its last contact with the mobile terminal 90. If the last contact was during a LT down time, then the VLR re-registers the mobile terminal with the proper LT once it receives the updated partition.

In a preferable embodiment, LTSM 40 has the intelligence to decide how to re-route the load to other servers. LTSM 40 looks at the aggregate load of all partitions on a particular LT. If a certain LT is loaded more heavily than another, LTSM 40 directs the heavily loaded LT to stop servicing certain partitions of MIs and transfers them to an under utilized LT.

Figure 4:
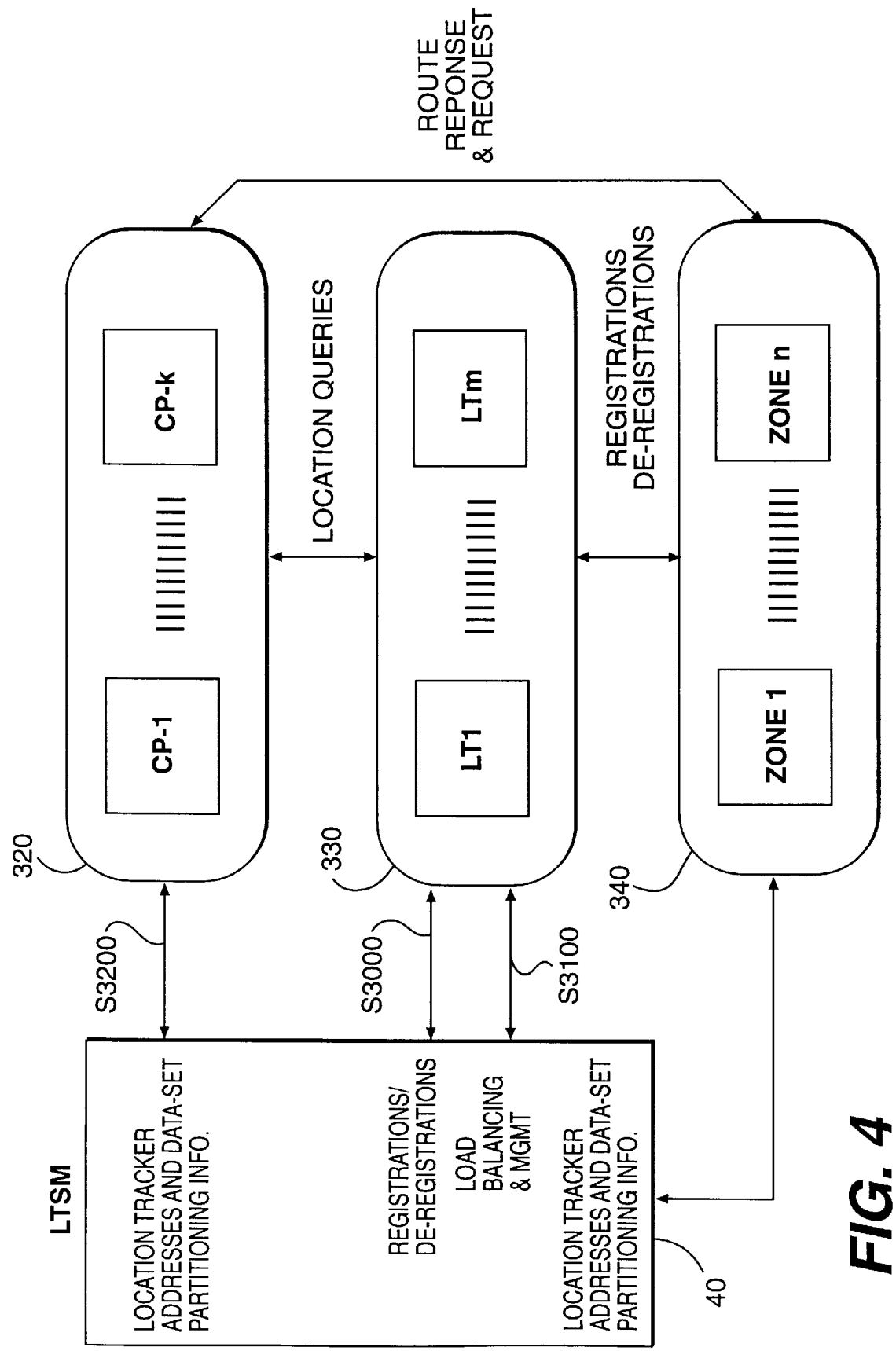
FIG. 4 is a graphical representation of the functional entity groups that interact with the Location Tracking service.

FIG. 4 shows the different entity groups that interact with the Location Tracking service. Zones (1 . . . n) 340, LTs (1 . . . m) 330, LTSM 40 are functional and logic representations of the previously disclosed elements in FIGS. 1, 2, and 3. CPs (1 . . . k) 320, or call processing service entities, reside with the switching facilities of zones 70–78 and the mobility switch 140 and are responsible for directing the switching facilities to route incoming calls for mobile subscribers to their appropriate locations. The location tracking service is provided by LT1-LTm 330 and managed by LTSM 40.

An example of the interaction is illustrated by the following. An LT 330 registers itself with LTSM 40 (S3000) and also responds to queries about its current load (S3100). The query responses include informing LTSM 40 which MI partitions are contributing the most load allowing LTSM 40 to initiate application-specific load balancing. The LTs are also responsible for de-registering from LTSM 40 when they go out of service. For example, if an LT 330 crashes, LTSM 40 would detect it in one of the following ways: 1) the server does not respond to a load query; 2) zone 340 informs LTSM 40 that a server is not responding; or 3) MCP 30 informs LTSM 40 that the server is down.

Call Processing (CP) 320 service entities provide the call management intelligence to the switching elements in the zones and the mobility switches. CPs also interact with the LTs by querying the location of mobile terminals (S3200). The CPs have access to the same Z-table (which maps the MI partition to a LT) that the zones access. For this reason, the procedure the CPs use for accessing the LTs is the same as for VLRs. CP 320 queries the LT for a call routing number and the LTs query the appropriate VLR and transmits the result to the CP service entity. The CP service entity then directs its switching element to route the call to the indicated routing number.

The foregoing description of a preferred embodiment of the invention has been presented for purposes of illustration and description. It is not intended to be exhaustive or to limit the invention to the precise form disclosed. Modifications and variations are possible in light of the above teachings or may be acquired from practice of the invention.

What is claimed is:

1. A wireless communication system, including a distributed home location register, for tracking the location of mobile terminals, comprising:

a Mobility Control Point (MCP) mechanism for controlling communications in a plurality of geographically spaced zones and providing storage capabilities for service information relating to mobile terminals; a plurality of Central Processing Units (CPUs) associated with each MCP, each CPU including a corresponding Home Location Register (HLR), for storing enabled service information of a subset of mobile terminals serviced by the plurality of zones;

a plurality of Visitor Location Registers (VLRs), associated with each CPU and corresponding HLR, for temporarily storing mobile terminal data and connected to the associated CPU for communicating with the plurality of CPUs and corresponding HLRs;

means for tracking the location of the mobile terminals from one zone to another; and a Location Tracking Service Manager (LTSM) configured to maintain proper load distribution throughout the system, wherein the LTSM includes:

means for dynamically partitioning a plurality of mobile terminal identifiers used for identifying associated service information into blocks;

means for storing a partitioning of mobile terminal identifiers into a memory map; and means for transmitting the memory map.

2. The wireless communication system of claim 1, wherein the means for transmitting further includes:

means for transmitting the memory map to each CPU and corresponding HLR, in the plurality of CPUs; and means for transmitting the memory map to each VLR, in the plurality of VLRs, for enabling the VLR to identify the CPU and corresponding HLR, in the plurality of CPUs, and for servicing the particular partitioning of mobile terminals; and wherein the LTSM further includes means for sending an updated memory map to the VLR when the VLR requests the updated memory map after receiving an error message from the connected CPU and corresponding HLR, and for indicating the CPU and corresponding HLR no longer service the particular partitioning of mobile terminals;

means for computing the current and optimal load distribution for each CPU and corresponding HLR; and means for sending an off-load message to the CPU and corresponding HLR when the CPU and corresponding HLR have a higher service load than other CPUs and corresponding HLRs in the system.

3. The wireless communication system of claim 1, wherein the means for tracking the location of mobile terminals includes means for receiving registration messages from the VLR when a mobile terminal enters the VLR's and corresponding zone's service area;

means for transmitting mobile terminal information from the HLR to the VLR when a valid registration message is received from the VLR;

means for rejecting a mobile terminal registration request when the LTSM informs the CPU that the mobile terminal is no longer serviced by the corresponding HLR;

means for sending de-registration message to the previously occupied zone for the registered mobile terminal leaving the zone;

means for receiving mobile terminal location queries from call processing services entities;

means for responding to mobile terminal location queries from call processing services entities;

means for sending location tracking load balance information to the LTSM; and means for receiving updated memory map from the LTSM after a reassignment of mobile identifiers is performed by the LTSM; and means for sending an overload message to the LTSM when the CPU, in the plurality of CPUs, determines the CPU's service load is higher then optimal service load, as defined by the LTSM.

4. The means for tracking of claim 3, wherein the means for rejecting a mobile terminal registration request further includes means for sending an error message to the requesting zone when requested HLR no longer services the particular partitioning containing the mobile terminal information.

5. The wireless communication system of claim 1, wherein the HLR includes means for identifying the zone where each mobile terminal is currently located for routing calls to the zones serving the mobile terminal;

means for receiving subscriber service information from the MCP at the startup of the HLR's operation;

means for periodically transmitting updated mobile terminal location information to the MCP;

means for transmitting mobile terminal information and subscriber service information to the VLR located in the zone currently servicing the mobile terminal;

means for periodically updating mobile terminal location information and subscriber service information.

6. The wireless communication system of claim 1, wherein each zone, in the plurality of zones, includes a memory map for storing a plurality of partition numbers for determining from which HLR to request mobile terminal information.

7. The wireless communication system of claim 1, with each VLR, in the plurality of VLR's, including means for determining from which means for tracking to request mobile terminal information by identifying the means for tracking servicing the mobile terminal identifier;

means for requesting mobile terminal information from the HLR associated with the mobile terminal;

means for receiving terminal information from the HLR servicing the mobile terminal; and means for time-stamping mobile terminal location information received from the HLR servicing the mobile terminal.

8. In a wireless communication system, a method for distributing Home Location Register (HLR) functionality and managing HLR load distribution, the method comprising the steps of:

storing a plurality of mobile terminal identifiers, for identifying a mobile terminal and service data associated with the mobile terminal, in the memory of a Mobility Control Point (MCP);

partitioning the plurality of mobile terminal identifiers among a plurality of means for tracking the location of mobile terminals moving among a plurality of zones into blocks;

transmitting the partitioning of mobile terminal identifiers to the memory of each means for tracking, for access by a plurality of zones associated with each means for tracking; computing current and optimal load distribution among the means for tracking;

periodically transmitting load information to a Location Tracking Service Manager (LTSM);

re-distributing the partitioning of mobile terminal identifiers among the plurality of means for tracking; and transmitting the partitioning of mobile terminal identifiers to an HLR, associated with each means for tracking, upon receipt of an overload message from one of the means for tracking.

9. The method of claim 8 wherein the step of storing a plurality of mobile terminal identifiers includes the substep of periodically updating the memory with additional mobile terminal identifiers when mobile terminals are added to or subtracted from the system.

* * * * *

UNITED STATES PATENT AND TRADEMARK OFFICE
CERTIFICATE OF CORRECTION

PATENT NO. : 6,138,016
DATED : October 24, 2000
INVENTOR(S) : Jayant A. Kulkarni et al.

It is certified that error appears in the above-identified patent and that said Letters Patent is hereby corrected as shown below:

<u>IN THE CLAIMS:</u>

Claim 7, col. 8, line 66, after "receiving", insert --mobile--.

Signed and Sealed this

Eighth Day of May, 2001

*Attest:*

NICHOLAS P. GODICI

*Attesting Officer*        *Acting Director of the United States Patent and Trademark Office*